July 14, 1970  P. H. EVANS  3,520,212
CONTROL KNOB
Filed Nov. 5, 1968

INVENTOR:
PHILIP HENRY EVANS
BY Kurt Kelman
AGENT

United States Patent Office 3,520,212
Patented July 14, 1970

3,520,212
CONTROL KNOB
Philip H. Evans, Wollaston, England, assignor to
BSR Limited, Warley, England, a British company
Filed Nov. 5, 1968, Ser. No. 773,557
Claims priority, application Great Britain, Nov. 8, 1967,
50,706/67
Int. Cl. F16d *1/10;* G05g *1/02*
U.S. Cl. 74—543          8 Claims

ABSTRACT OF THE DISCLOSURE

A control knob assembly comprising a control knob and a member upon which the control knob is to be provided. The control knob is made of an inherently resilient plastics material and has a socket to receive part of the member upon which the knob is to be fitted, the knob has an arm the free end of which has a lug which snap inter-engages with a lug provided on said part of the member thereby securing the knob to the member. More than one arm may be provided on the knob and a corresponding number of lugs on the member.

BACKGROUND OF THE INVENTION

Field of the invention

This invention relates to a manually operable control knob assembly for apparatus and instruments, such as tape recorders and players, record players and other domestic appliances such as washing machines and the like, or any appliance or instrument which has one or more control knobs which are required to be pushed or turned with the fingers to initiate some operation of the apparatus or instrument.

Description of prior art

It has been common practice to make these control knobs of plastics material and generally, hitherto, a control knob of plastics material has been fitted to a metal knob receiving member by moulding the plastics material about a part of the member or by fixing a knob to the member by means of pins, rivets or screws.

SUMMARY OF THE INVENTION

An object of the invention is to provide an improved control knob assembly in which the mounting for the control knob on the knob receiving member is improved and simplified.

The invention is, in a control knob assembly comprising a control knob and a member upon which the knob is provided, the improvement wherein said control knob is made of an inherently resilient plastics material and comprises, a body part, an open ended socket formed in said body part, said socket having a longitudinal axis, an arm formed integrally with said body part and extending therefrom on one side of said socket in a direction parallel to said axis and having a free end distant from said body part, a lug formed on said free end of said arm and extending generally normal to said axis, an end part of said member engaged in said socket, a projection spaced from said end part, an abutment surface formed on said projection and extending generally normally to said axis and facing away from said end part and said lug being resiliently engaged with said abutment surface to retain said knob on said member.

A part of the surface of said arm may be formed as a continuation of part of the external surface of said knob.

The socket may be of generally rectangular configuration in cross section taken normal to the longitudinal axis of the socket.

Said body portion may be of generally rectangular external configuration in cross section taken normal to said longitudinal axis of said socket.

Said arm may be of generally rectangular external configuration in cross section taken normal to the longitudinal axis of the socket.

Said arm may be provided at a corner of the body of the knob so that two adjacent external surfaces of the knob constitute side and end surfaces of the arm.

The part of the member engaged in said socket may be of thin right parallelopiped form and said lug may comprise a projection on a longitudinal side of the member, said projection having side surfaces which are coplanar with the side surfaces of the part of the member from which the projection extends.

Said abutment surface may extend generally normally to said side surfaces and said arm may extend so that a surface of said arm extends across a side surface of the projection and said lug on said arm engages with said abutment surface.

BRIEF DESCRIPTION OF THE DRAWINGS

One embodiment of the invention will now be described in more detail by way of example with reference to the accompanying drawing wherein.

DESCRIPTION OF THE PREFERRED EMBODIMENT

Figure 1:
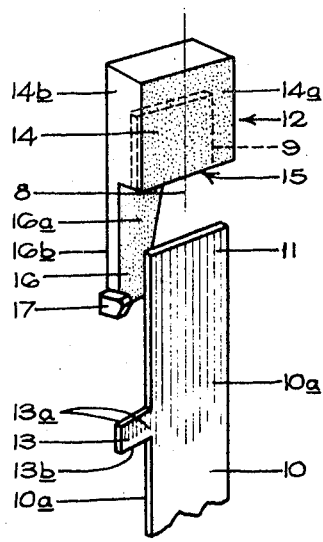
FIG. 1 is an exploded perspective view of a knob assembly according to the invention.

Referring firstly to FIG. 1, a member to which a knob is to be fixed has a part comprising a flat metal bar 10 of thin, right parallelopiped form and having two flat side surfaces 10a. The free end 11 of the part 10 is to have a control knob 12 fixed thereto. Said part 10 of the member has a projecting lug 13 provided on one longitudinal side edge of the part 10 and the lug 13 has two oppositely disposed side surfaces 13a which are coplanar with the side surfaces 10a of the part 10. The lug 13 also has an abutment surface 13b which is normal to the side surfaces 13a and which faces away from the end 11 of the part 10. The projecting lug 13 is spaced a short distance away from the free end 11 of the part 10.

The control knob has a body part 14 provided with a socket 9 in the form of a slot of rectangular configuration taken in cross sections normal to the longitudinal axis 8 of the socket. The socket 9 extends within the body 14 from the underside 15 thereof. The body part 14 is of rectangular external configuration in cross sections taken normal to the longitudinal axis 8 of the socket 9 and has two pairs of external surfaces 14a and 14b. The socket 9 is of dimensions sufficient to receive the free end 11 of the part 10 and to be a reasonably tight fit therewith but not sufficiently tight to prevent the control knob being removed when desired.

Figure 2:
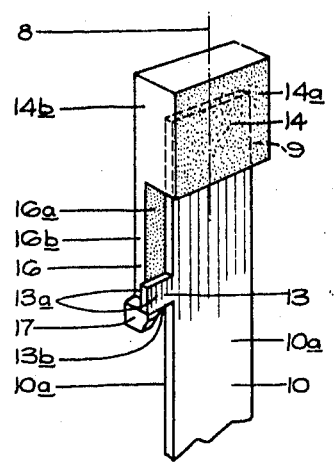
FIG. 2 is a perspective view of the assembled knob assembly.

Extending from the body 14 of the control knob on one side of the socket 9 is a tapered arm 16 of rectangular external configuration in cross sections taken normal to the longitudinal axis 8 of the socket 9. The arm 16 extends generally parallel to the longitudinal axis 8 of the socket 9 and has two pairs of external surfaces 16a and 16b, two adjacent surfaces of which are coplanar with two adjacent external surfaces 14a and 14b of the body 14 of the control knob. The arm 16 has, at its free end, a projecting lug 17 which extends normal to the arm 16. The complete knob is made of an inherently resilient plastics material and so the arm 16 which is of relatively small cross section is resiliently flexible so that, in use, as shown in FIG. 2, when the free end 11 of the part 10 is inserted into the socket 9 of the body 14 of the knob 12 a surface 16a of the arm 16 extends over a surface 13a of the projecting lug 13 on the part 10 and the lug 17 at the end of the arm 16 springs behind the lug 13 into engagement with the abutment surfaces 13b of the lug 13 and thus retains the control knob 12 firmly in position on the part 10.

If desired, the knob can be removed from the part 10 simply by bending the arm 16 to release the engagement between the lugs 17 and 13 after which the knob can be easily removed by withdrawing the knob from the free end of the part 10.

Instead of a single arm 16 there may be two such arms positioned on diagonally opposite sides of the knob with the lugs 17 facing in opposite directions and the part 10 may be provided with two oppositely disposed lugs 13.

I claim:
1. In a control knob assembly comprising a control knob and a member upon which the knob is provided, the improvement wherein said control knob is made of an inherently resilient plastics material and comprises, a body part, an open ended socket formed in said body part, said socket having a longitudinal axis, an arm formed integrally with said body part and extending therefrom on one side of said socket in a direction parallel to said axis and having a free end distant from said body part, a lug formed on said free end of said arm and extending generally normal to said axis, an end part of said member engaged in said socket, a projection spaced from said end part, an abutment surface formed on said projection and extending generally normal to said axis and facing away from said end part and said lug being resiliently engaged with said abutment surface to retain said knob on said member.

2. The improvement according to claim 1 wherein said part of said surface of said arm is formed as a continuation of part of the external surface of said knob.

3. The improvement according to claim 2 wherein said socket is of generally rectangular configuration in cross section taken normal to the longitudinal axis of the socket.

4. The improvement according to claim 3 wherein said body portion is of generally rectangular external configuration in cross section taken normal to the longitudinal axis of the socket.

5. The improvement according to claim 4 wherein said arm is of generally rectangular external configuration in cross section taken normal to the longitudinal axis of the socket.

6. The improvement according to claim 5 wherein said arm is provided at a corner of said body of said knob so that two adjacent external surfaces of said knob constitute side and end surfaces of said arm.

7. The improvement according to claim 6 wherein said end part of said member engaged in said socket is of thin right parallelopiped form and said lug comprises a projection on a longitudinal side of said member, said projection having side surfaces which are co-planar with the side surfaces of the part of the member from which said projection extends.

8. The improvement according to claim 7 wherein said abutment surface extends generally normally to said side surfaces and said arm extends so that a surface of said arm extends across a side surface of said projection and said lug on said arm engages with said abutment surface.

References Cited

UNITED STATES PATENTS 3,167,336   1/1965   Lewis.

FOREIGN PATENTS 1,018,565   1/1966   England.

FRED C. MATTERN, JR., Primary Examiner

F. D. SHOEMAKER, Assistant Examiner

U.S. Cl. X.R.

287—53